United States Patent [19]
Wernig

[11] Patent Number: 5,826,922
[45] Date of Patent: Oct. 27, 1998

[54] ROTARY LATCH ASSEMBLY FOR A COMPUTER HOUSING

[75] Inventor: Glenn Alan Wernig, San Jose, Calif.

[73] Assignee: Silicon Graphics, Inc., Mountain View, Calif.

[21] Appl. No.: 815,636

[22] Filed: Mar. 13, 1997

[51] Int. Cl.⁶ .................................................. E05C 1/06
[52] U.S. Cl. .......................................... 292/39; 292/172
[58] Field of Search .............................. 292/39, 172, 153, 292/DIG. 11

[56] References Cited

U.S. PATENT DOCUMENTS

| | | | |
|---|---|---|---|
| 1,518,613 | 12/1924 | Teeter | 292/39 |
| 2,500,849 | 3/1950 | Menns | 292/39 |
| 3,792,885 | 2/1974 | Giardina | 292/39 |
| 4,288,944 | 9/1981 | Donovan | 292/39 |
| 4,679,415 | 7/1987 | Spratt | 292/39 |

FOREIGN PATENT DOCUMENTS 15902 of 1900 United Kingdom .

*Primary Examiner*—Flemming Saether
*Attorney, Agent, or Firm*—Wagner, Murabito & Hao

[57] ABSTRACT

A rotary latch assembly which allows for simple, inexpensive and reliable attachment of a computer bezel to a computer housing. Latches disposed on each side of the bezel engage openings in the computer housing so as to secure the bezel to the computer housing. The latches are attached to rails which includes gears. A knob which includes rotary gears extends through an opening in the bezel. The rotary gears engage the gears of both of the rails such that the latches may be moved within a limited range by rotating the knob. Thus, the bezel may be removed by rotating the knob such that the latches move inward, thereby disengaging the latches from the openings in the computer housing.

19 Claims, 7 Drawing Sheets

ROTARY LATCH ASSEMBLY FOR A COMPUTER HOUSING

TECHNICAL FIELD

The present claimed invention relates to the field of attachment mechanisms. More specifically, the present claimed invention relates to an improved attachment mechanism for attaching a bezel to a housing of a computing device.

BACKGROUND ART

Prior art methods for securing a front panel which is commonly referred to as a bezel to a computer housing involve the use of screws which either engage the computer housing or which engage the chassis of the computer. The use of screws means that a screwdriver is required to remove the bezel. The process of removing multiple screws takes time and the operation takes two hands. Furthermore, screws are not desirable as they are difficult to manage and they require a tool to insert and remove. In addition, screws take a significant amount of time to put in and remove and they can be easily lost.

It is desirable to limit a user's access to the internal components of the computer. This prevents an unauthorized operator from opening the computer bezel and accessing internal components of the computer and possibly damaging the computer or add-on components located within the computer housing. In addition, by restricting unauthorized access to the internal components of the computer, theft of hardware is prevented. The bezel, in this case, protects the drives and other delicate hardware, but allows access to media in the drives(floppies, CD's, etc.). Therefore, there has been a need for a latching mechanism which may be locked and unlocked by a user qualified to access the internal components of the computer so as to prevent unauthorized access.

Other prior art methods for attaching a bezel to a computer housing simply involve the snapping of snaps projecting from each side of the bezel into openings in the computer housing designed to receive the snaps. This type of latching mechanism also requires two hands to operate. In addition, with this type of latching mechanism there is no mechanism for locking the bezel in place to prevent unauthorized access.

A recent prior art method for latching a bezel to a computer housing involves the use of a separate latch assembly which is located on each side of the bezel. Each hook engages an undercut in the computer housing. Thus, each side of the bezel must be independently latched and unlatched. This process requires two hands. To lock a panel with this design requires a separate locking part to restrict the bezel from opening. In addition to the use of a separate locking part, a lock which may be a paddle lock is required. The lock and the separate locking part are cumbersome to deal with and they are not completely concealed. In addition, the exposure of the lock and portions of the separate locking part is not aesthetically desirable.

One recent prior art method for locking a bezel to a computer housing uses a metal L-shaped bar that is inserted between the top of the chassis and top of the computer housing. The bar extends through an opening in the back of the computer housing. A projecting flange that has an opening that corresponds to an opening in the bar allows a padlock to be inserted through the opening in the flange and through the opening in the L-shaped bar in the back of the computer. Once the end of the L-shaped bar is locked, the bezel may not be removed since the other end of the bar extends across the front of the bezel. This type of latching mechanism is difficult to remove since the user must first get behind the computer to unlock the padlock. Next the user must move around to the front of the computer and remove the L-shaped bar. Then the bezel may be removed. This involves numerous steps and takes a significant amount of time. Furthermore, this type of design may confuse users since they will not see the lock unless they look behind the computer. These prior art latches may be locked by lock bars which are located behind a separate door and which are not visible to the user. This can be confusing to users that want to open the bezel because they can see the mechanism for opening the bezel but they cannot open the bezel because of the locking mechanism. The lock bar does not prevent the latches from being activated, yet the lock prevents the bezel from opening. Thus, users who attempt to remove the bezel typically think that the bezel is simply stuck, and they may try to force the bezel open, causing unplanned damage to the bezel and to the latches.

Another type of prior art device, infrequently used on desktop computers, is the hinged access panel. Prior art devices that use a hinged access panel typically attach the access panel to the left or right side of the housing and the access panel pivots away from the main computer for access to internal hardware and components. A single latch can be used to capture the other side of the panel when it is closed. This single latch may be easily locked. However, the use of a hinged attaching panel is not practical as the attaching panel remains attached to the computer as it pivots open, requiring a large clearance area in front of the computer. The requirement of a large clearance area is particularly impractical for desktop computer applications since space is critical to the user.

What is needed is a latching mechanism which will secure a bezel to a computer housing and which is easy to operate. In addition, a latching mechanism which will give the user feedback with regard to whether or not the latching mechanism is locked is required. In addition, since it is not required that the bezel be removed frequently, a design in which the latching mechanism and the locking mechanism are hidden from view during normal operations and daily use is required. However, the design must allow the user to easily find, access and operate the latching mechanism and the locking mechanism when repairs or installations are required to be performed that require that the bezel be removed. The present invention provides an elegant solution that meets the above needs.

DISCLOSURE OF THE INVENTION

The present invention meets the above needs with a latching mechanism which secures a bezel to a computer housing. The latching mechanism is operated by rotating a single knob on the front of the bezel. The latching mechanism may be easily locked by the use of a standard lock which is located near the knob. The lock and the knob are located behind a door attached to the front of the bezel.

A computer which includes a chassis covered by a computer housing is disclosed. A bezel encloses the computer such that the chassis is enclosed on the top, on the bottom and on three sides by the computer housing, with the bezel enclosing the front. A door located in the bezel allows a user to access devices such as drives which require the insertion and removal of removable media such as disks, tapes, etc. A knob which is part of the latching mechanism is also located behind the door. The knob may be locked by inserting an ordinary lock such as a desk drawer lock into an opening near the knob. The lock prevents access to the internal components of the computer by unauthorized users. In addition, since the latch and the lock are placed behind the door, they are not in plain sight.

The knob includes rotary gears disposed on the rear side of the knob. The rotary gears on the knob engage with the gears on two rails. The two rails run on opposite sides of the wheel and extend to opposite sides of the bezel. Upon the rotation of the knob, the rotary gears on the knob engage the gears on each of the two rails such that the two rails move in opposite directions. Thus, the rails move inward or outward depending on the direction of rotation. A hub fits over the rotary gears of the knob and over the two rails so as to protect the gears and hold everything together.

Latches are connected to the ends of each rail. As the bezel is closed, the latches wipe against the surface of the housing until they hit the openings in each side of the housing, then the latches enter into the openings in the housing. The latches then move outward, into the fully extended position. In the fully extended position, the latches securely hold the bezel to the computer housing. A spring provides constant tension so that the latches stay in the fully extended position until the knob is manually rotated. Upon rotation of the knob, the rails move inward, compressing the springs, thereby moving the latches inward so as to move the latches out of the openings in the computer housing. The bezel may then be separated from the computer housing.

The latch mechanism also includes a spring assembly located on each side of the bezel. The spring assemblies include latch housings which hold the latching mechanism in the fully extended position when the knob is not being turned. The use of spring assemblies allows for the easy and flexible assembly of the mechanism. Since the latches are secured within the spring assembly, the latches remain in place, assembled to the bezel, irrespective of whether or not the rails and the knob are assembled. The latches may be assembled into the spring assemblies and attached to the bezel in one step and the knob and the rails may be assembled in a subsequent assembly step.

The present invention allows for the easy removal and replacement of the bezel as there are no screws to screw in, keep up with, and screw out. In addition, no special tools such as a screwdriver are needed. Furthermore, since the latching mechanism may be unlatched by the rotation of a single knob, one handed operation is possible. The simplicity of operation makes the mechanism simple to operate. The mechanism is easy to operate and is reliable. There are no surfaces protruding from the rear of the bezel that can be damaged while the bezel is disconnected from the chassis such as protruding plastic snaps. Furthermore, there are no screws to get lost. An off the shelf desk drawer lock with key actuation can be installed and used to lock the device by disabling it. Thus, making it clear to the user that the lock must be disengaged before the latch assembly can be activated and the bezel removed. This prevents accidental damage due to confused users trying to force the bezel open. Thus, the present invention provides a simple and elegant solution to the problems associated with prior art attachment mechanisms.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
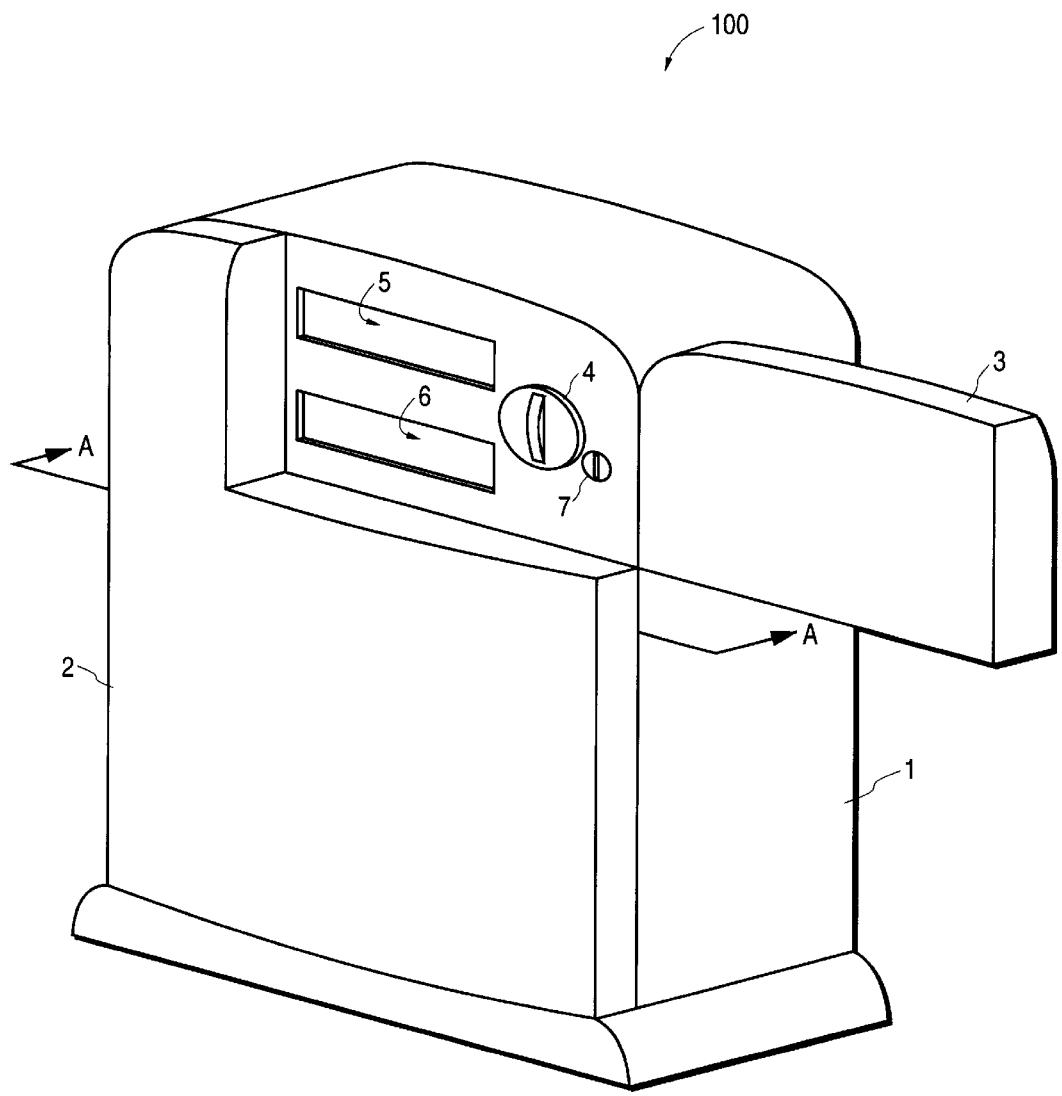
FIG. 1 is a front view of a computer having a door which is open in accordance with the present invention.

With reference now to FIG. 1, computer 100 is shown to include a housing 1 which encloses the top, the bottom, and three sides of computer 100. Bezel 2 encloses the front of Computer 100. Door 3 is shown to be open, exposing drive 5 and drive 6. With door 3 open, the user has easy access to drive 5 and drive 6. Drive 5 and drive 6 could be floppy disk drives, CD ROM drives, read/write disk drives, tape drives or any of a number of other accessories to which the user may need to access through the bezel on a regular basis. Also exposed by the opening of door 3 is knob 4 and lock 7. Rotary knob 4 fits within bezel 1. Rotary knob 4 is made of injection molded plastic. Bezel 2 is secured to housing 1 such that it may only be removed by rotation of rotary knob 4. Lock 7 allows rotary knob 4 to be locked so that it may not be rotated. Thus, when lock 7 is locked, bezel 2 cannot be removed. Lock 7 is an ordinary off-the-shelf lock which may be locked and unlocked by using a key. A simple lock such as the locks commonly used to lock desks and filing cabinets may be used as lock 7. Lock 7 is easily visible once door 3 is opened, thus giving feedback to anyone attempting to remove bezel 2 that bezel 2 may be locked. The placement of rotary knob 4 and lock 7 behind door 3 allows a user to close door 3 during normal operation of computer 100. Thus, the user does not have to continually look at knob 4 and lock 7 which are infrequently used. However, since door 3 is easy to open, a user may readily gain access to drives 5–6 and knob 4 and lock 7 by opening door 3.

Figure 2:
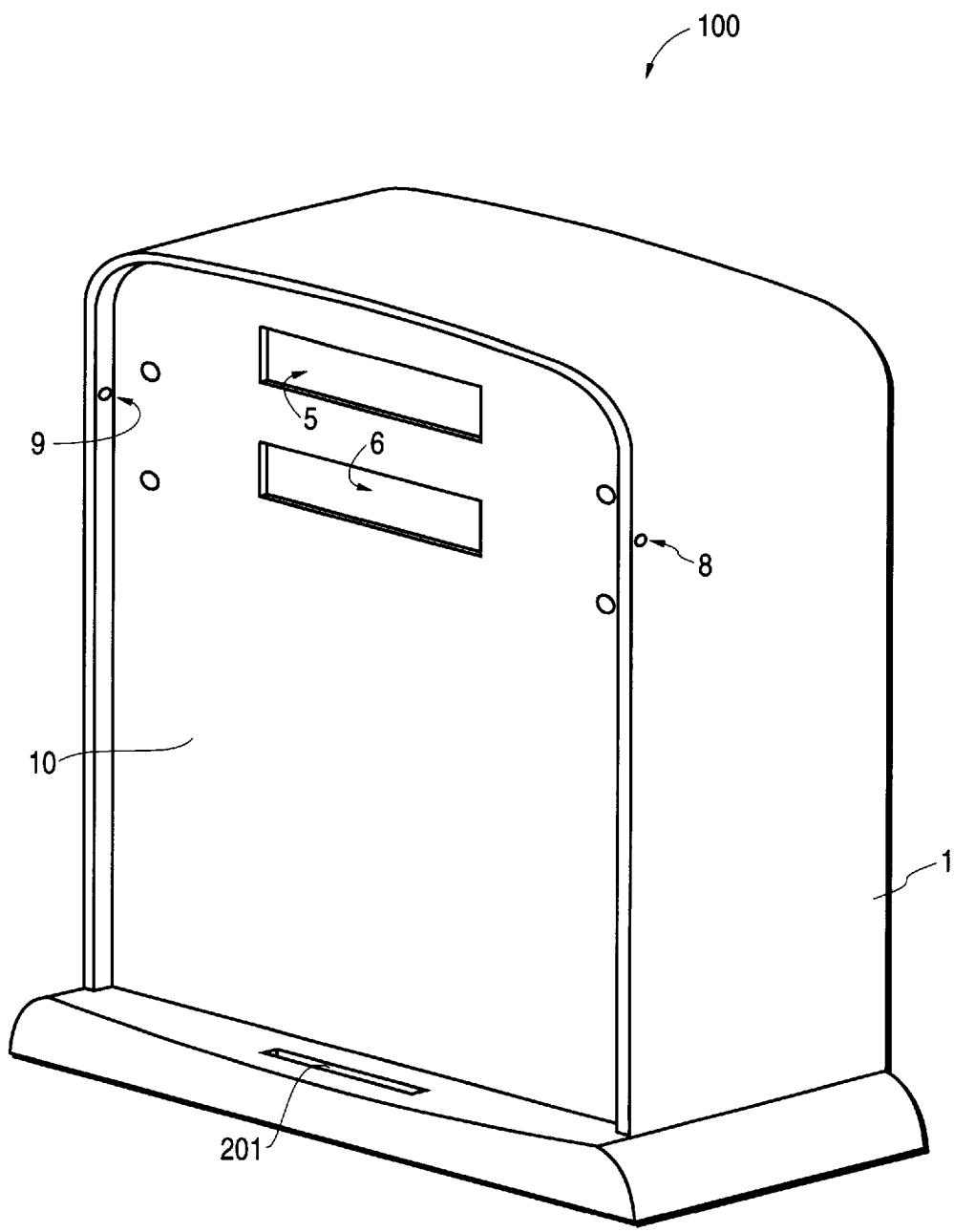
FIG. 2 is a front view of a computer with the bezel removed in accordance with the present invention.

FIG. 2 shows a front view of computer 100 with bezel 2 removed. computer housing 1 is shown to include opening 8 and opening 9 which extend from the inside of housing 1 so as to receive the latches (not shown) that secure bezel 2 (not shown) to housing 1. Opening 201 receives a flange protruding from the bottom of bezel 2 (not shown) so as to hold the bottom of bezel 2 to housing 1 when bezel 2 is attached to housing 1. Housing 1 encloses chassis 10 which houses the internal components of computer 100. Computer 100 includes electronic circuits for data input and output, data storage and data processing.

Figure 3:
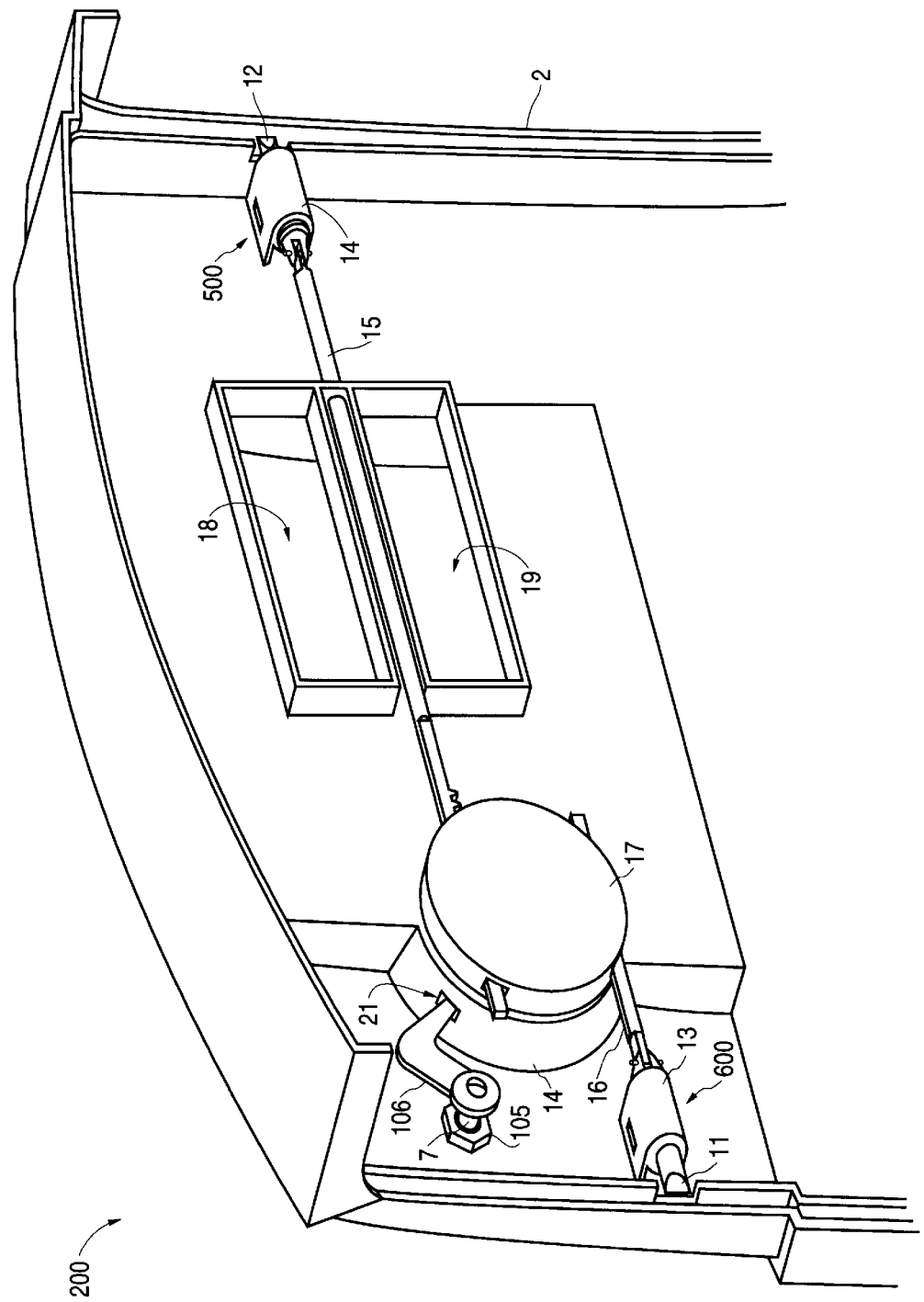
FIG. 3 is a rear view of a bezel in accordance with the present invention.

FIG. 3 shows a rear view of bezel 2. Opening 18 and opening 19 in bezel 2 allow access to drive 5 (not shown) and drive 6 (not shown) when bezel 2 is latched to housing 1(not shown). Latch assembly 200 includes spring assembly 500 and spring assembly 600, rail 15, rail 16, knob 4 (not shown) and hub 17. Latch 11 and latch 12 move horizontally so as to secure bezel 2 to housing 1 (not shown). Latch 11 fits within latch housing 13 and is connected to rail 16. Latch housing 13 is made of plastic and is attached by molded-in snaps to bezel 2. Latch 12 fits within latch housing 14 and is connected to rail 15. Latch housing 14 is made of plastic and is attached by molded-in snaps to bezel 2. Hub 17 attaches to bezel 2 so as to secure rail 15 and rail 16 to bezel 2. Rail 15, rail 16 and latches 11–12 may move within a limited range horizontally. Lock 7 which is secured by nut 105 engages lock arm 106 which fits into opening 21 so as to allow for the locking of the latching mechanism.

Figure 4:
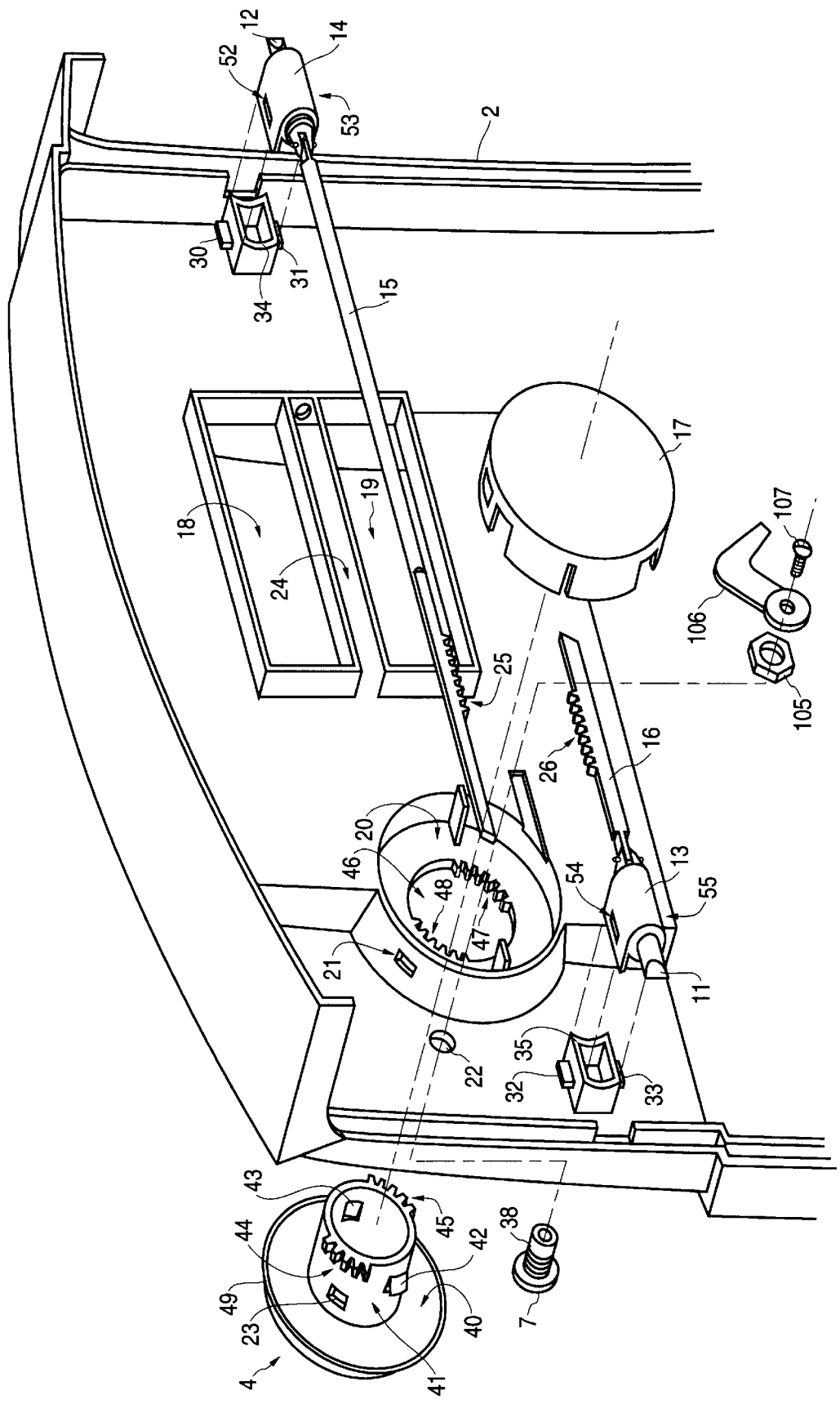
FIG. 4 is an exploded rear view of a bezel in accordance with the present invention.

FIG. 4 shows an exploded view of the structure of FIG. 3. It can be seen that knob 4 includes lip 49 that extends from rear surface 40 which is flat. Lip 49 provides a reduced friction surface against the bezel as the knob is rotated. Also extending from rear surface 40 is tubular surface 41. Snap 42 and snap 43 are formed within tubular surface 41 such that they may deflect towards the center of knob 4. Rotary gear 44 and rotary gear 45 extend from tubular surface 41 of knob 4. Knob 4 is formed of injection molded plastic and lip 49, rear surface 40, tubular surface 41, snaps 42–43, locking slot 23 and rotary gears 44–45 are integrally formed within knob 4. Opening 46 has a diameter slightly larger than the outer diameter of tubular surface 41. Opening 46 in bezel 2 includes notches 47 and notches 48 which are formed to provide clearance upon knob insertion for rotary gears 44–45.

Continuing with FIG. 4, upon the insertion of knob 4 into opening 46 in bezel 2, notches 47–48 receive rotary gear 44 and rotary gear 45. Upon further insertion of knob 4 into opening 46 of bezel 2, the sides of opening 46 contact the outer surfaces of snap 42 and snap 43 so as to deflect snap 42 and snap 43. Snap 42 and snap 43 continue to deflect as knob 4 is inserted further until such time as knob 4 is fully inserted into opening 46 in bezel 2. Upon full insertion of knob 4 into opening 46 of bezel 2, the side surfaces of snaps 42–43 extend past the side surface of opening 46 of bezel 2 such that snap 42 and snap 43 move back into their original positions (not deflected). This locks knob 4 to bezel 2 such that knob 4 is secured to bezel 2 by snaps 42–43. Knob 4 can only be removed by pressing snap 42 and snap 43 inward while pulling knob 4 out from opening 46. However, knob 4 is free to rotate since snaps 42–43 do not interfere with the rotation of knob 4.

Continuing with FIG. 4, mounting surface 34 is located on one side of bezel 2 and mounting surface 35 is located on the opposite side of bezel 2. Snap 30 and snap 31 extend from mounting surface 34. Similarly, snap 32 and snap 33 extend from mounting surface 35. Mounting surfaces 34–35 and snaps 30–33 are injection-molded plastic and are integrally formed within bezel 2. Slot 52 and slot 53 within latch housing 14 mate with snap 30 and snap 31 so as to secure latch housing 14 to bezel 2. Similarly, slot 54 and slot 55 receive snap 32 and snap 33 such that latch housing 13 may be easily and securely attached to bezel 2. Rail 15 includes gear 25 which is made of teeth that project from rail 15. Channel 24 within bezel 2 receives rail 15 such that rail 15 fits within rotary housing 20. Rail 16 includes gears 26 which are teeth that project from rail 16. Rail 16 is shorter than rail 15 due to the fact that the latch is off-center. The latch is placed off-center so as to allow for openings 18–19 to be centrally located. Gear 25 and gear 26 extend over rotary housing 20. Hub 17 attaches to housing 2. Slots in hub 17 allow hub 17 to fit over rail 15 and rail 16 such that gears 25 and gears 26 are disposed within rotary housing 20 and inside of hub 17. Rotary gear 44 engages gear 25 and rotary gear 45 engages gear 26 upon the rotation of knob 4. Gears 25 and gears 26 and rails 15–16 are free to move within a limited range horizontally. Opening 22 extends from the front of bezel 2 through the back side of bezel 2 so as to allow for lock 7 to be inserted into bezel 2. Upon the insertion of lock 7 into opening 22, lock 7 is secured to bezel 2 by nut 105 that fits over lock 7 and which engages threads 38 of lock 7. Opening 21 extends through the side of rotary housing 20 so as to allow the locking arm 106 of lock 7 to enter into rotary housing 20 so as to lock rotary knob 4. Locking arm 106 is secured to the rear of lock 7 with screw 107.

Figure 5:
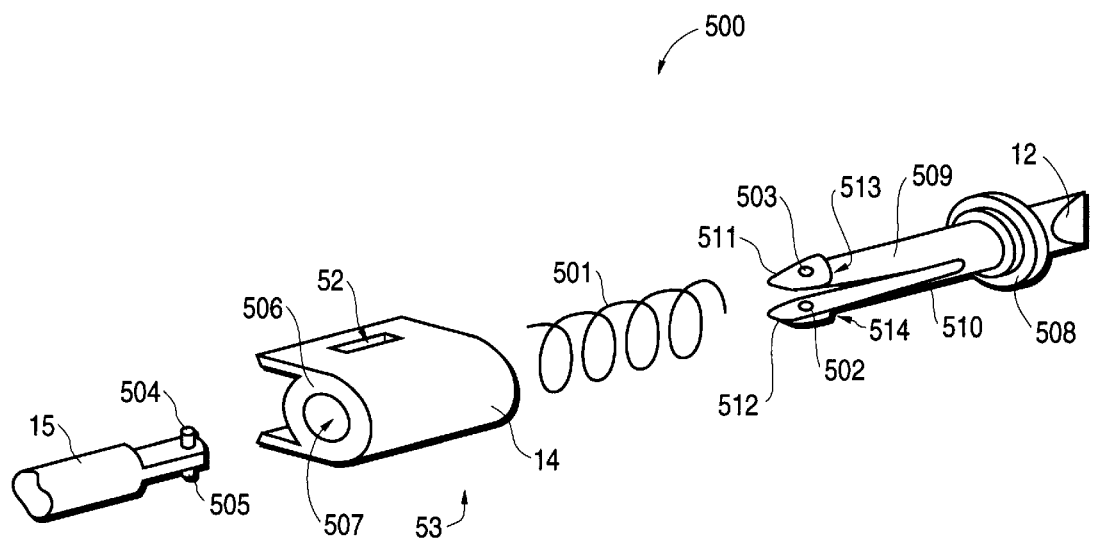
FIG. 5 is an exploded rear view of a rail and a spring assembly in accordance with the present invention.

FIG. 5 shows a exploded view of spring assembly 500 which couples to rail 15. Spring assembly 500 includes latch 12, spring 501, and latch housing 14. Spring 501 is a metal spring. Latch housing 14 and latch 12 are formed of injection molded plastic. Latch 12 includes a latching end that extends from collar 508 to the end of latch 12. On the other side of collar 508 is the attachment end of latch 12 which consists of flange 509 and flange 510. At the attachment end of flange 509 is snap 511 which includes opening 503. At the attachment end of flange 510 is snap 512 which includes opening 502. Snap 511 includes an angled surface which extends from the attachment end of flange 509 to locking surface 513. Similarly, snap 512 includes an angled surface which extends from the attachment end of flange 510 to locking surface 514. Locking surface 513 and locking surface 514 are angled so as to lock flange 12 in place once flange 12 is inserted into latch housing 14. Latch housing 14 is open on one end and is closed at its other end except for opening 507. Opening 507 extends through surface 506 of latch housing 14.

Continuing with FIG. 5, spring assembly 500 is assembled by inserting latch 12 into latch housing 14 such that flange 509 and flange 510 pass through the center of spring 501. Further insertion of latch 12 causes snap 511 and snap 512 to contact the walls of opening 507 in latch housing 14. The contact between the walls of opening 507 and the surfaces of snaps 511–512 exerts force against flanges 509–510 and causes flange 509 and flange 510 to deflect inward until the ends of snap 511 and snap 512 are reached. As the end of snaps 511–512 are reached, the force on flange 509 and flange 510 is released, snapping flange 509 and flange 510 outward. Thus, flange 509 and flange 510 move back into their non-deflected state. Once latch 12 is fully inserted, locking surface 513 and locking surface 514 of snaps 511–512 contact surface 506 of latch housing 14 so as to hold spring assembly 500 together. Spring 501 contacts circular collar 508 and contacts the inside of latch housing 14 so as to exert force against latch 12, keeping latch 12 in the fully extended position. Flange 515 fits inside the end of spring 501, keeping it centered within housing 14 and prevents it from rubbing against the surfaces of housing 14 and flanges 509–510. In the fully extended position, locking surface 513 and locking surface 514 contact surface 506 of latch housing 14.

Continuing with FIG. 5, rail 15 includes pin 504 and pin 505. Rail 15 is attached to spring assembly 500 by inserting rail 15 between flange 509 and flange 510 such that pin 504 and pin 505 engage opening 502 and opening 503 of snaps 511–512. Upon insertion of rail 15 between flange 509 and flange 510, flange 509 and 510 contact the ends of pin 504 and pin 505 and are forced outward. The force on flange 509 and flange 510 deflects the flanges outward, away from each other. As pin 504 and pin 505 reach openings 502–503, pin 504 enters into opening 502 and pin 505 enters into opening 503, releasing the force on flanges 509–510. As the force is released, pins 504–505 snap into opening 502 and 503, thereby locking rail 15 to latch 12.

Figure 6:
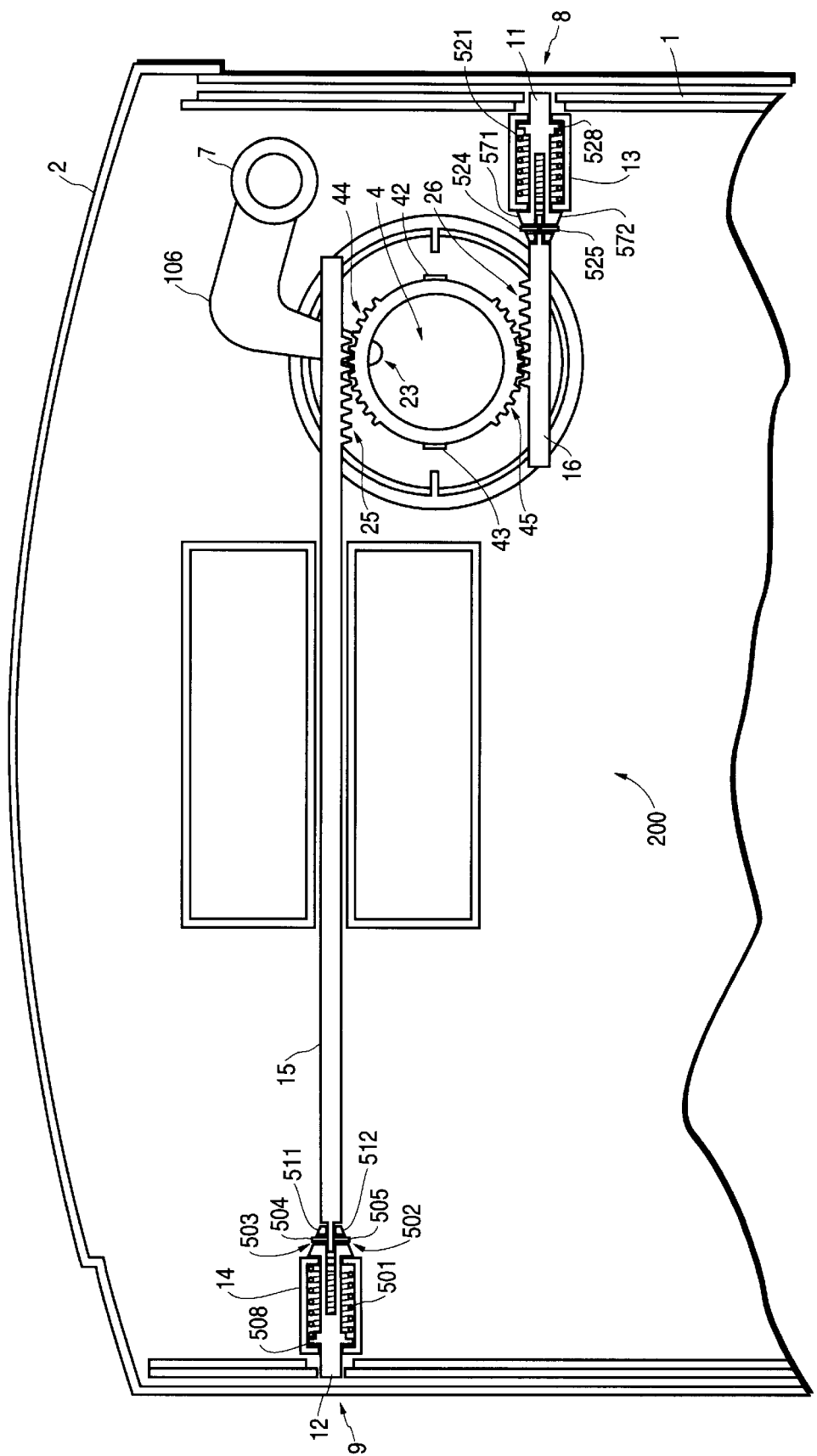
FIG. 6 is an exploded cross sectional view of a computer along axis A—A of FIG. 1 showing a latch assembly in the filly extended position in accordance with the present invention.

FIG. 6 shows a cross-sectional view showing latch assembly 200 is in the fully extended position. Spring 521 presses against collar 528 of latch 11 and spring 501 presses against collar 508 of latch 12 so as to hold latch assembly 200 in the fully extended position. Snap 571 and snap 572 contact latch housing 13 and secure latch 11 within latch housing 13 such that latch 11 is free to move within a limited range within latch housing 13. Similarly, snap 511 and snap 512 contact the outer surface of latch housing 14 and secure latch 12 within latch housing 14 such that latch 12 is free to move within a limited range within latch housing 14. Pin 524 and pin 525 engage openings in rail 16, thereby securing latch 11 to rail 16. Similarly, it can be seen that pins 504 and 505 fit within openings 502–503 within snaps 511–512 so as to secure rail 15 to latch 12. In the fully extended position, the latching end of latch 12 extends into opening 9 in computer housing 1 so as to secure bezel 2 to computer housing 1. Similarly, in the fully extended position, the latching end of latch 11 extends into opening 8 so as to secure bezel 2 to computer housing 1. Knob 4 is locked into place by snaps 42–43 such that knob is secured to bezel 2. Lock 7 is locked. The locking of lock 7 extends locking arm 106 such that locking arm 106 of lock 7 engages locking slot 23, thereby preventing the rotation of knob 4. Gear 25 of rail 15 meshes with rotary gear 44. Similarly, gear 26 of rail 16 meshes with rotary gear 45. Upon unlocking lock 7, locking arm 106 rotates away from locking slot 23. Therefore, when lock 7 is unlocked, there is no contact with locking slot 23, allowing knob 4 to freely rotate within a limited range.

Continuing with FIG. 6, upon the application of manual rotary force to knob 4, rotary gears 44–45 apply the force to gears 25–26 so as to apply the force linearly to rails 15–16. This force moves rail 15 and rail 16 inwards. This movement is typical of rack and pinion gear systems with knob 4 and rotary gears 44–45 acting as the pinion and rail 15 and rail 16 acting as racks. Rail 15 pulls latch 12 inward and rail 16 pulls latch 11 inward until further motion is prevented by the full compression of spring 501 and spring 521. Upon full compression of spring 501 and spring 521, latch assembly 200 moves into the fully retracted position.

Figure 7:
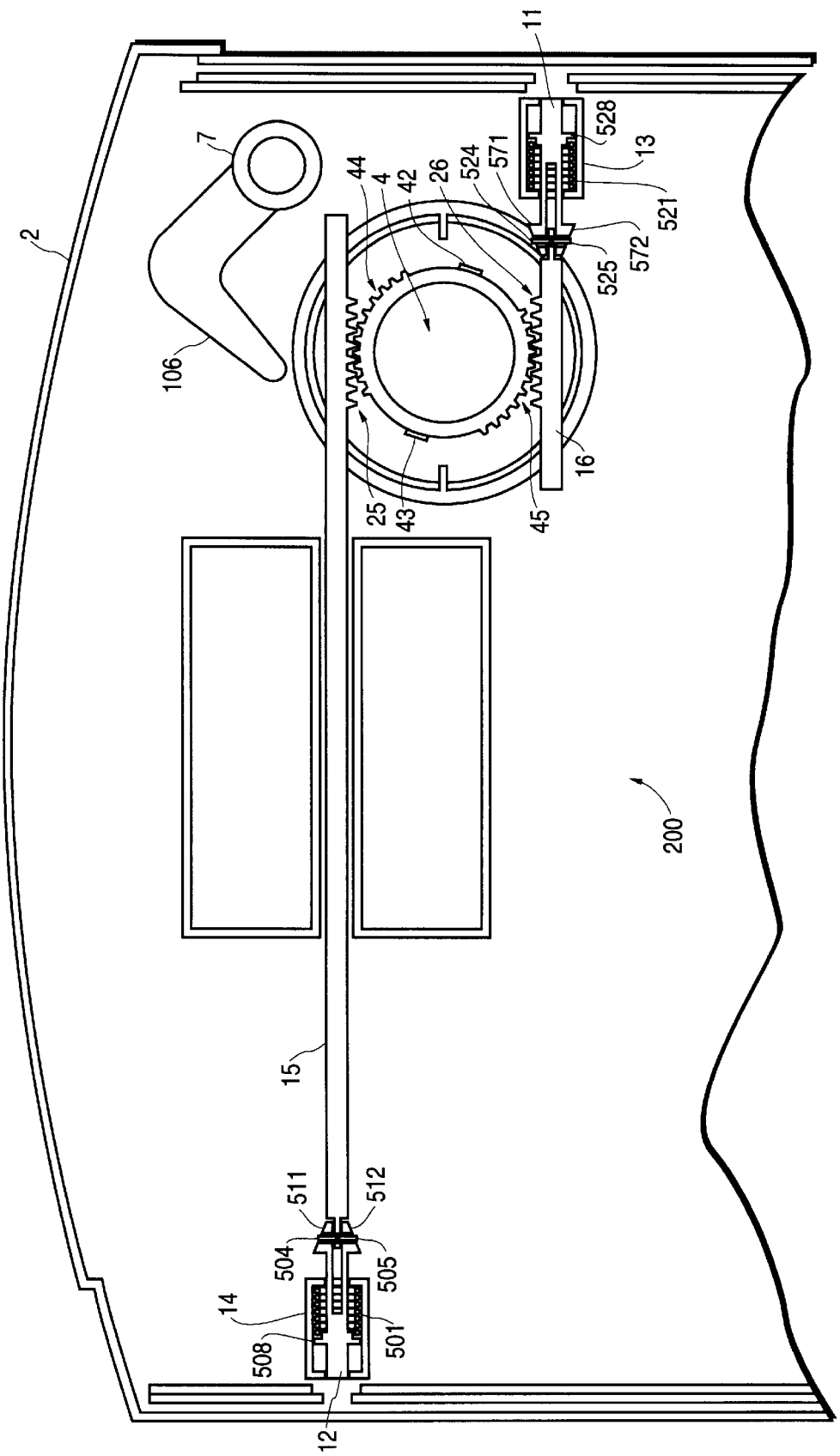
FIG. 7 is an exploded cross sectional view of a computer along axis A—A of FIG. 1 showing a latch assembly in the fully retracted position in accordance with the present invention.

FIG. 7 shows the structure of FIG. 6 after knob 4 is rotated into the fully retracted position. Knob 4 is rotated such that rotary gears 44–45 have moved rail 16 inward approximately 0.25 inches. The movement of rail 16 pulls latch 11 inwards. It can be seen that spring 521 is fully compressed. Therefore, spring 521 exerts a force against collar 528 of latch 11. Similarly, the application of force to the gears 25 of rail 15 has moved rail 15 inward approximately 0.25 inch. The movement of rail 15 pulls latch 12 inwards. It can be seen that spring 501 is fully compressed. Therefore, spring 501 exerts a force against collar 508 of latch 12. At this time, bezel 2 may be removed from computer housing 100.

Continuing with FIG. 7, once rotary force is removed from knob 4, the force of spring 501 against latch 12 and the force of spring 521 against latch 11 is translated into kinetic energy, moving latch 11 and rail 16 outward. The force of spring 501 against latch 12 is also translated into kinetic energy, moving latch 12 and rail 15 outward. This movement applies force through gears 25–26 which is translated to rotary gears 44–45 so as to rotate knob 4. The latch assembly continues to move until such time as springs 501 and 521 reach maximum compression against latch housing 14 and latch housing 13 so as to prevent further movement. Thus, latch assembly 200 returns to the fully extended position.

Continuing with FIG. 7, the latch assembly 200 in the present invention is easy to use. A user simply needs to unlock lock 7 using a designated key. Then, the user may rotate knob 4. Bezel 2 may then be detached from computer housing 1. The rotation of knob 4 is a one handed operation. In addition, there is no need to remove separate parts such as screws, bars and locks. Furthermore, the components of the latching assembly 200 are not subject to being lost since they remain attached to bezel 2. Lock 7 allows the bezel to be securely locked to the computer housing. The placement of lock 7 in close proximity to knob 4 gives the user feedback that the housing may be locked. This feedback prevents the confusion caused by prior art systems as to whether or not the user could open the bezel. Furthermore, though the latch and the rail extending to each side of the bezel could be a single piece of plastic or metal, the present invention is described as having two parts, a latch and a rail such that the latch may be detached from the rail. Thus, allowing for easier and more flexible assembly of the latch mechanism.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. An enclosure for a computer comprising;
   a computer housing,
   a bezel removably coupled to said computer housing;
   a first rail having a first set of gears on one end and having a first latch at its other end, said first rail attached to said housing and said set of gears disposed such that said first latch may move within a limited range;
   a second rail having a set of gears on one end and having a second latch at its other end, said second rail secured to said bezel and said gears of said second rail disposed such that said second rail may move within a limited range; and
   a rotary knob disposed within an opening in said bezel, said rotary knob having a set of rotary gears disposed therein, said set of rotary gears meshing with said first set of rotary gears and said second set of gears such that, said rotary knob may be rotated so as to move said first rail and said second rail such that said first latch and said second latch may project from said bezel so as to secure said bezel to said housing.

2. The latching mechanism of claim 1 further comprising a first spring and a second spring and wherein said first spring is disposed around said first latch so as to hold said first latch into an extended position and wherein said second spring is disposed around said second latch so as to hold said second latch into an extended position, and wherein force may be applied to said rotary knob so as to rotate said rotary knob so as to move said first latch and said second latch into a retracted position, said first spring and said second spring exerting force on said first latch and said second latch such that, upon the cessation of application of force, said first latch and said second latch move back into said extended position.

3. The latching mechanism of claim 2 wherein said first latch and said second latch comprise plastic.

4. The latching mechanism of claim 3 wherein said rotary housing compromises plastic and wherein said rotary housing is attached to said bezel.

5. The latching mechanism of claim 3 wherein said bezel includes a rotary housing and wherein said bezel and said rotary housing comprise plastic, said rotary housing integrally formed within said bezel.

6. The latching mechanism of claim 5 further comprising a hub, said hub shaped so as to be received by said rotary housing so as to secure said first rail and said second rail.

7. The latching mechanism of claim 5 wherein said bezel includes a first latch housing and a second latch housing and wherein said first latch is disposed within said first latch housing such that said first latch may move within a limited range within said first latch housing and said second latch is disposed within said second latch housing such that said second latch may move within a limited range within said second latch housing.

8. The latching mechanism of claim 7 wherein said first latch housing and said second latch housing comprise plastic having slots disposed so as to allow said first latch housing and said second latch housing to snap into said bezel so as to secure said first latch housing to said bezel and so as to secure said second latch housing to said bezel.

9. An enclosure for a computer comprising:
a computer housing;
a bezel removably coupled to said computer housing;
a first latch secured to said bezel such that said first latch may move within a limited range;
a first spring disposed around said first latch such that said first latch is biased in an extended position;
a second latch secured to said bezel such that said second latch may move within a limited range;
a second spring disposed around said second latch such that said second latch is biased in an extended position;
a rotary knob disposed within an opening in said bezel, said rotary knob including rotary gears;
a first rail including a first set of gears, said first set of gears disposed adjacent to said rotary knob such that said first set of gears meshes with said rotary gear, said first rail connected to said first latch such that said rotary knob may be rotated so as to move said first rail inwards, thereby moving said first latch out of said extended position; and
a second rail including a second set of gears, said second set of gears disposed adjacent to said rotary knob such that said second set of gears meshes with said rotary gear, said second rail connected to said first latch such that said rotary knob may be rotated so as to move said second rail inwards, thereby moving said second latch out of said extended position.

10. The latch mechanism of claim 9 wherein said rotary knob comprises plastic.

11. The latch mechanism of claim 10 wherein said rotary knob includes an opening within which a lock may be inserted so as to prevent said rotary knob from rotating.

12. The latch mechanism of claim 11 wherein said rotary knob includes a front surface having a raised surface extending therefrom for easily grasping and rotating said knob manually.

13. The latch mechanism of claim 12 wherein said first rail and said second rail comprise plastic.

14. The latch mechanism of claim 13 wherein said first rail includes a plurality of pins adapted to fit within openings in said first latch such that said first rail may be attached to said first latch by engaging said pins within said openings in said first latch and wherein said second rail includes a plurality of pins adapted to fit within openings in said second latch such that said second rail may be attached to said second latch by engaging said pins within said openings in said second latch.

15. The latch mechanism of claim 14 wherein said latch mechanism further includes a first latch housing and a second latch housing, said first latch housing and said second latch housing attached to said bezel such that said first latch may be disposed within said first latch housing such that one end of said first spring contacts said first latch housing and the other end of said spring contacts said flange of first latch so as to bias said first latch into the extended position and wherein said second latch may be disposed within said second latch housing such that one end of said second spring contacts said second latch housing and the other end of said spring contacts said flange of said second latch so as to bias said second latch into the extended position.

16. The latch mechanism of claim 15 wherein said rotary knob includes locking snaps which secure said rotary knob to said bezel such that said rotary knob may rotate.

17. A latching bezel comprising:
a bezel shaped so as to mate with a computer housing so as to enclose a computer within said computer housing, said bezel having a front side and a rear side, and having an opening formed therein;
a first latch housing attached to said rear side of said bezel;
a first latch including a collar disposed within said first latch housing such that said first latch may move within a limited range;
a first spring disposed around said first latch such that said first spring contacts said collar of said first latch and contacts said first latch housing such that one end of said first latch extends from said first latch housing so as to engage an opening in said computer housing, thereby securing said bezel to said computer housing;
a second latch housing attached to said rear side of said bezel;
a second latch including a collar disposed within said second latch housing such that said second latch may move within a limited range;
a second spring disposed around said second latch such that said second spring contacts said collar of said second latch and contacts said second latch housing such that one end of said second latch extends from said second latch housing so as to engage an opening in said computer housing, thereby securing said bezel to said computer housing;

a rotary knob disposed within said opening in said bezel, said rotary knob including rotary gears;

a first rail including a first set of gears, said first set of gears disposed adjacent to said rotary knob such that said first set of gears meshes with said rotary gear, said first rail connecting to said first latch such that said rotary knob may be rotated so as to move said first rail inwards, thereby moving said first latch inwards so as to disengage said first latch from said housing; and a second rail including a second set of gears, said second set of gears disposed adjacent to said rotary knob such that said second set of gears meshes with said rotary gear, said second rail connecting to said first latch such that said rotary knob may be rotated so as to move said second rail inwards, thereby moving said second latch inwards so as to disengage said second latch from said housing.

18. The locking bezel of claim 17 further including a door attached to the front side of said bezel such that said door may be opened to expose said rotary knob and such that said door may be closed as to enclose said rotary knob.

19. The locking bezel of claim 18 wherein said rotary knob includes an opening formed therein for locking said rotary knob such that said rotary knob cannot be rotated, thereby preventing the removal of said bezel from said computer housing.

* * * * *